United States Patent [19]

Hall

[11] 4,028,508
[45] June 7, 1977

[54] TELEPHONE LOCK

[76] Inventor: James N. Hall, 2851 Barker Ave., Bronx, N.Y. 10467

[22] Filed: June 2, 1976

[21] Appl. No.: 692,134

[52] U.S. Cl. .......................................... 179/189 D
[51] Int. Cl.² ...................................... H04M 1/66
[58] Field of Search ...................... 179/189 D, 90 D

[56] References Cited
UNITED STATES PATENTS 3,899,647  8/1975  Nachsi et al. .................. 179/189 D

*Primary Examiner*—Thomas W. Brown
*Attorney, Agent, or Firm*—Allen D. Brufsky

[57] ABSTRACT

A locking device is provided for use in preventing the unauthorized use of telephones of the type having a handset and a base wherein the calling element is contained on the inner surface of the headset. The device includes a fixed engaging element attached to a locking element by means of a strap which encircles the outer surface of the handset. An adjustable engaging element is further provided and is adjustably secured to the locking element. When the calling element is a rotary dial, the engaging elements engage the dial and prevent rotation thereof. When the calling element is a plurality of push buttons, the engaging elements engage a protective cover and prevent manipulation of the pushbutton.

6 Claims, 3 Drawing Figures

TELEPHONE LOCK

BACKGROUND OF THE INVENTION

The present invention relates generally to a telephone locking device and more particularly, to a locking device which may be used on telephones of the type where a dial or a plurality of pushbuttons are contained on the telephone handset.

Trimline and princess type phones have become increasingly popular in recent years since they offer a telephone which is more aesthetically appealing than conventional desk-type telephones. Such telephones include a handset which includes either a dial or pushbutton for placing a call. The handset is connected to a handset holder and is placed within the holder when not in use.

While numerous types of telephone locking devices have been used in the past, almost all of these devices were designed to prevent the unauthorized use of conventional desk-type telephones where the dial or pushbuttons are contained on the base of the telephone rather than in the handset. Examples of such locking devices are described in U.S. Pat. Nos. 2,397,954 to A. E. Feldman; 3,824,317 to R. M. Buckingham; and 3,866,000 to R. D. Gillis.

The problem with the telephone locking devices heretofore employed is that they are unable to be used on Trimline or Princess type phones due to the fact that they either extend above the dial or pushbutton thus preventing return of the handset to the handset holder, or they are unable to be secured to the handset to effectively prevent access to the dial or pushbuttons It is therefore an object of the present invention to provide a telephone locking device which can be used to prevent access to a telephone where the dial or pushbuttons are contained on the handset.

SUMMARY OF THE INVENTION

To the accomplishment of the foregoing object and advantages, the present invention briefly comprises a locking element for use in preventing the unauthorized use of telephones of the type wherein the calling element is contained on the inner surface of the handset. The device comprises a U-shaped fixed engaging element attached to a locking element by means of a strap which encircles the outer surface of the handset. An adjustable engaging element is further provided and is adjustably secured to the locking element. When the calling element is a rotary dial, the engaging elements are adapted to engage the dial by insertion into apertures contained therein on order to prevent rotation thereof. When the calling element is a plurality of pushbuttons, a protective cover is provided over the plurality and is secured in place by engagement by said engaging elements to prevent manipulation of the buttons.

BRIEF DESCRIPTION OF THE DRAWINGS

The foregoing and still other objects and advantages of the present invention will be more apparent from the following detailed explanation of the invention in connection with the accompanying drawings wherein.

DESCRIPTION OF THE PREFERRED EMBODIMENT

Figure 1:
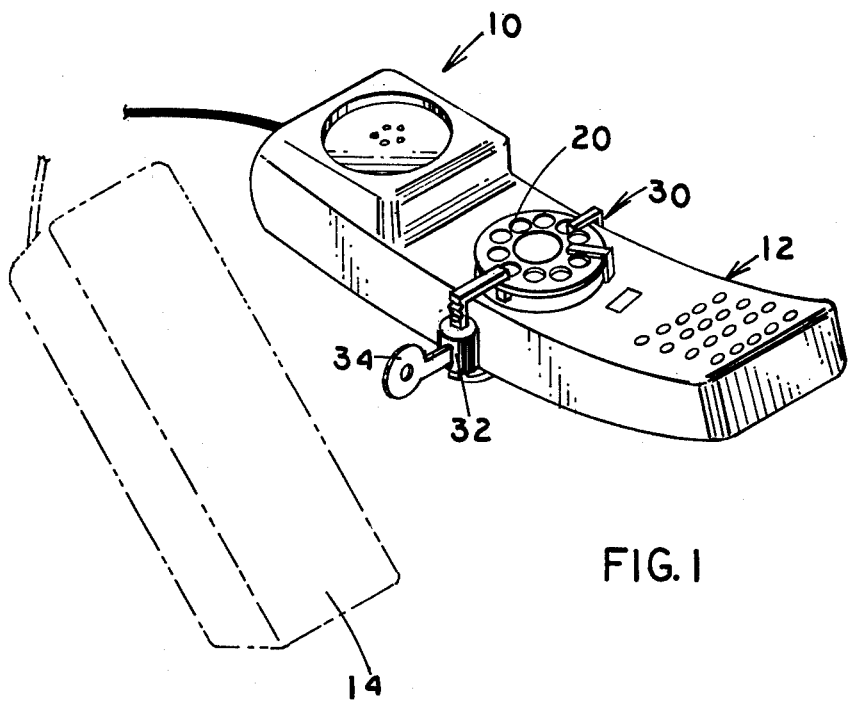
FIG. 1 is a perspective view of a telephone handset equipped with the locking device of the present invention.
Figure 2:
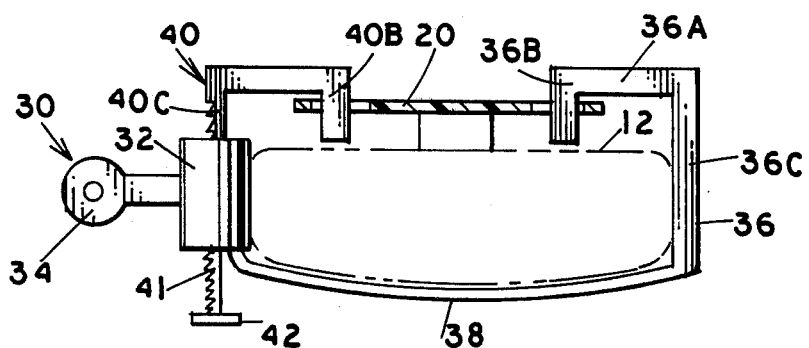
FIG. 2 is an end view of the telephone handset of FIG. 1.

Referring now to FIGS. 1 and 2, there is shown a telephone referred to generally by reference numeral 10 which includes a handset 12 and a handset holder 14 adapted to receive and hold the handset 12 when the telephone 10 is not in use. The handset 12, within embodiment of FIGS. 1 and 2 includes a dial 20 centrally positioned on the inside surface of the handset 12 for placing calls.

The locking device of the present invention, referred to generally by reference numeral 30, includes a cylinder lock 32 which is adapted to receive and be locked and unlocked by a key 34. The cylinder lock 32, when the locking device 30 is in its operative position, is positioned on one edge of the telephone handset 12, and is attached to a generally U-shaped fixed locking clip 36 which is positioned on the opposite edge of the handset 12 by means of a strap portion 38 which extends around the outside surface of the handset 12. The fixed locking clip 36 includes a base section 36A with a shorter dimensioned side section 36B and a longer dimensioned side section 36C both extending perpendicularly from the base section 36A.

The strap portion 38 is preferably formed from a relatively thin sheet of metal and should be generally flexible. If desired, the strap portion 38 may be the same color as the telephone 10. The strap portion 38 is secured at one end thereof to the cylinder lock 32 and at the other end thereof to the longer dimensioned side section 36C of the fixed locking clip 36.

A generally U-shaped adjustable locking clip 40 is further provided and includes a base section 40A with a shorter dimensioned side section 40B and a longer dimensioned side section 40C extending perpendicularly from the base section 40A. The longer dimensioned side section 40C includes a serrated side portion 41 and terminates in a shoulder portion 42. The longer dimensioned side section 40C with its serrated side portion 41 is adapted to be received within the cylinder lock 32 and extend through its axial extend. The serrated side portion 41 permits releasable engagement with the locking mechanism of the cylinder lock 32 dependent upon the position of the key 34.

In order to be used on a telephone 10 wherein the dial 20 is included in the handset 12, the locking device 30 of the present invention is placed about the handset 12 such that the shorter dimensioned side section 36B of the fixed locking clip 36 and the shorter dimensioned side section 40B of the adjustable locking clip 40 are inserted into the aperture within the dial 20. The adjustable locking clip 40 is then adjusted relative to the width of the telephone 10 such that the strap 38 is taut against the outside surface of the handset 12. The dial 20 is then locked into place by locking the serrated portion 41 of the adjustable locking clip 40 within the lock 32 by turning the key 34. The telephone 10 may be unlocked by releasing the serrated portion 41 of the adjustable locking clip 40 from within the cylinder lock 32.

Figure 3:
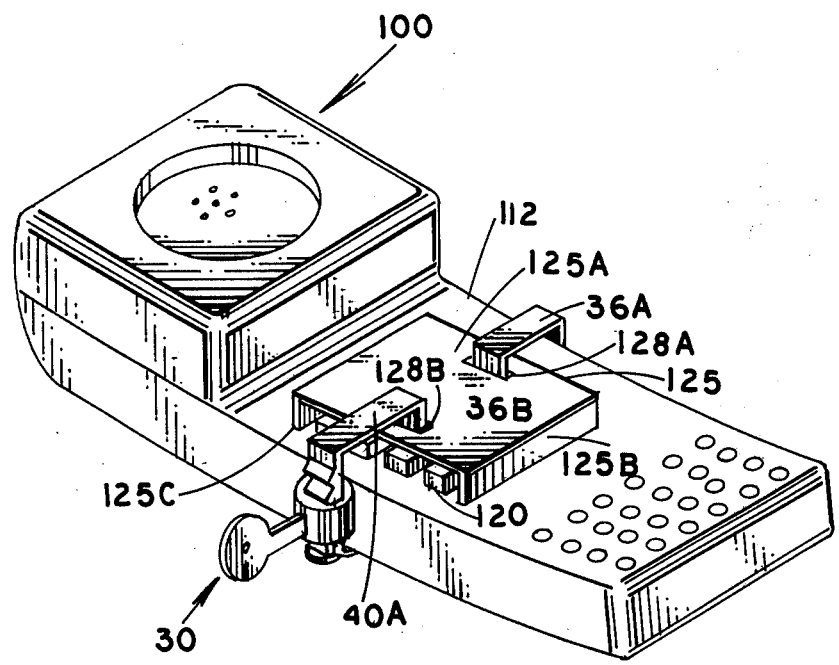
FIG. 3 is a perspective view of a telephone handset equipped with an alternate embodiment of the locking device of the present invention.

FIG. 3 illustrates the manner in which the present locking device 30 may be used with respect to a telephone 100 wherein a plurality of pushbuttons 120 rather than a dial are included on the inner surface of the handset 112. In this embodiment, a protective plate 125 having a substantially flat top portion 125A and two opposed side portions 125B and 125C extending perpendicularly from the top portion 125A is placed over the pushbuttons 120. The flat top portion 125 includes two slots 128A and 128B on opposite sides of the top portion 125A. The locking device 30 is then inserted about the handset 112 in the same manner as in the embodiment of FIGS. 1 and 2; however, the shorter dimensioned side sections 36B and 40B of the fixed locking clip 36 and the adjustable locking clip 40, respectively, are inserted into the slots 128A and 128B of the top portion 125A of the plate 125 rather than into the dial holes as in FIGS. 1 and 2. Similarly, the locking device 30 may be locked and released in the same manner as in the embodiment of FIGS. 1 and 2.

Having thus described the invention with particular reference to the preferred form thereof, it will be obvious that various changes and modifications may be made therein without departing from the spirit and scope of the invention as defined by the appended claims.

What is claimed is:

1. A telephone locking device for preventing the unauthorized use of a telephone of the type having a handset and a base portion and wherein a rotary calling dial is contained on the inside surface of the handset, said device comprising:
   a generally U-shaped fixed engaging element adapted to engage said rotary dial;
   a locking element attached to said fixed engaging element by means of an encircling strap positioned about the outer surface of said handset; and
   a generally U-shaped adjustable engaging element adjustably secured to said locking element and adapted to engage said rotary dial in order to prevent rotation of said rotary dial.

2. The locking device of claim 1, wherein said locking element is a cylinder lock and wherein a serated portion of said adjustable engaging element is received within and adjustably secured to said cylinder lock.

3. The locking device of claim 1, wherein said engaging elements each have a shorter dimensioned side and an opposed longer dimensioned side and wherein each of said engaging elements each adapted to engage said rotary dial by insertion of each of said shorter dimensioned sides into an aperture contained in said rotary dial.

4. A telephone locking device for preventing the unauthorized use of a telephone of the type having a handset and a base portion and wherein a plurality of pushbutton calling elements are contained on the inside surface of the handset, said device comprising:
   a protective cover for said pushbutton calling elements;
   a generally U-shaped fixed engaging element adapted to engage said cover;
   a locking element attached to said fixed engaging element by means of an encircling strap positioned about the outer surface of said handset; and
   a generally U-shaped adjustable engaging element adjustably secured to said locking element and adapted to engage said protective cover in order to prevent manipulation of said plurality of pushbuttons.

5. The locking device of claim 4, wherein said locking element is a cylinder lock and wherein a serated portion of said adjustable engaging element is received within and adjustably secured to said cylinder lock.

6. The locking device of claim 4, wherein said protective cover includes at least two slots and wherein said engaging elements each have a shorter dimensioned side and an opposed longer dimensioned side, each of said engaging elements adapted to engage said protective cover by insertion of its respective said shorter dimensioned side into a corresponding slot.

* * * * *